United States Patent [19]

Agrawal et al.

[11] Patent Number: 5,722,051
[45] Date of Patent: Feb. 24, 1998

[54] ADAPTIVE POWER CONTROL AND CODING SCHEME FOR MOBILE RADIO SYSTEMS

[75] Inventors: Prathima Agrawal; Balakrishnan Narendran, both of New Providence; James Paul Sienicki, Edison; Shalini Yajnik, Scotch Plains, all of N.J.

[73] Assignee: Lucent Technologies Inc., Murray Hill, N.J.

[21] Appl. No.: 600,696

[22] Filed: Feb. 13, 1996

[51] Int. Cl.$^6$ ............................. H04B 1/00; H04B 7/00
[52] U.S. Cl. .......................... 455/69; 455/522; 455/88
[58] Field of Search ................... 455/67.1, 67.3, 455/63, 69, 88, 522; 371/41, 37.1, 43; 370/229, 230, 231, 232, 233, 234, 235, 236, 237, 522; 375/200, 206

[56] References Cited

U.S. PATENT DOCUMENTS

| | | | |
|---|---|---|---|
| 4,580,262 | 4/1986 | Naylor et al. | 455/69 |
| 4,777,653 | 10/1988 | Bonnerot et al. | 455/522 |
| 5,003,619 | 3/1991 | Morris et al. | 455/69 |
| 5,204,970 | 4/1993 | Stengel et al. | 455/69 |
| 5,293,639 | 3/1994 | Wilson et al. | 455/69 |
| 5,333,175 | 7/1994 | Ariyavistakul et al. | 455/69 |
| 5,383,219 | 1/1995 | Wheatley, III et al. | 371/43 |
| 5,535,238 | 7/1996 | Schilling et al. | 375/200 |
| 5,574,747 | 11/1996 | Lomp | 370/200 |
| 5,574,982 | 11/1996 | Almgren et al. | 455/69 |
| 5,638,412 | 6/1997 | Blakeney, II et al. | 455/69 |

OTHER PUBLICATIONS

S. Yajnik et al, "Adaptive Coding for Packetized Data in Wireless Networks," *Personal Indoor & Mobile Radio Comm. Conference*, Toronto, Canada, Sep. 1995, pp. 1–5.

T-H. Lee et al., "Downlink Power Control Algorithms for Cellular Radio Systems," *IEEE Trans. on Vehicular Tech.*, vol. 44, No. 1, Feb. 1995, pp. 89–94.

J. C-I. Chuang et al. "Uplink Power Control for TDMA Portable Radio Channels," *IEEE Trans. on Vehicular Tech.*, vol. 43, No. 1, Feb. 1994, pp. 33–39.

R. Knopp et al., "Information Capacity And Power Control In Single-Cell Multiuser Communications," *IEEE International Conf. on Comm. (ICC)* 1995, vol. 1, Jun. 18–22, Seattle, Washington, pp. 331–335.

S. Ariyavisitakul, "Autonomous SIR-Based Power Control for a TDMA Radio System," *IEEE Communications Society*, GLOBECOM 1993, Houston, Texas, vol. 1, Nov. 29–Dec. 2, 1993, pp. 307–310.

(List continued on next page.)

*Primary Examiner*—Reinhard J. Eisenzopf
*Assistant Examiner*—Marsha D. Banks-Harold
*Attorney, Agent, or Firm*—Kenneth M. Brown

[57] ABSTRACT

A dynamic combined power control and forward error correction control (FEC) technique for mobile radio systems which illustratively decreases the power consumed by wireless transmitters and increases the number of simultaneous connections which may be supported thereby. Individual transmitter-receiver pairs may adaptively determine the minimal power and FEC required to satisfy specified quality-of-service (QOS) constraints. Specifically, in accordance with an illustrative embodiment of the present invention, a first portion of a signal is encoded with a first code to generate a first encoded signal portion. Then, the first encoded signal portion is transmitted with a first power level. Next, parameter data is received, wherein the parameter data is representative of one or more characteristics of a received signal portion having been received by the receiver, the received signal portion having been based on the transmitted first encoded signal portion. A second code and a second power level is then determined based on the received parameter data, and a second portion of the signal is encoded with the second code to generate a second encoded signal portion. Finally, the second encoded signal portion is transmitted with the second power level.

22 Claims, 3 Drawing Sheets

OTHER PUBLICATIONS

V. Wong et al.,"A Transmit Power Control Scheme for Improving Performance in a Mobile Packet Radio System," *IEEE Trans. on Vehicular Tech.*, vol. 43, No. 1, Feb. 1994, pp. 174–180.

L. C. Yun et al., "Power Control for Variable QOS on a CDMA Channel," *Proc. IEEE MILCOM*, Fort Monmouth, NJ, Oct. 2–5, 1994, pp. 178–182.

D. Moore et al., "Variable Rate Error Control for Wireless ATM Networks," *IEEE International Conf. on Comm. (ICC)* 1995, Jun. 18–22, Seattle, Washington, pp. 988–992.

T. Matsumoto et al., "Performance Analysis of RS–Coded M– ary FSK for Frequency–Hopping Spread Spectrum Mobile Radios," *IEEE Trans. on Vehicular Tech.*, vol. 41, No. 3, Aug. 1992, pp. 266–270.

R. H. Deng, et al., "An Adaptive Coding Scheme With Code Combining for Mobile Radio Systems," *IEEE Trans. on Vehicular Tech.*, vol. 42, No. 4, Nov. 1993, pp. 469–476.

Y. Feria et al., "Seamless Data–Rate Change Using Punctured Convolutional Codes for Time–Varying Signal–to–Noise Ratio," *IEEE International Conf. on Comm. (ICC)* 1995, Seattle, Washington, Jun. 18–22, pp. 342–346.

R. R. Gejji, "Forward–Link–Power Control in CDMA Cellular Systems," *IEEE Trans. on Vehicular Tech.*, vol. 41, No. 4, Nov. 1992, pp. 532–536.

A. Sampath et al., "Power Control and Resource Management for a Multimedia CDMA Wireless System," *IEEE Proc. of the Personal Indoor & Mobile Radio Comm. Conf. (PIMRC '95)* Toronto, Canada, Sep. 25–29, 1995.

| CODE | n | k | t |
|---|---|---|---|
| $c_1$ | 63 | 63 | 0 |
| $c_2$ | 63 | 57 | 1 |
| $c_3$ | 63 | 51 | 2 |
| $c_4$ | 63 | 45 | 3 |
| $c_5$ | 63 | 39 | 4 |
| $c_6$ | 63 | 36 | 5 |
| $c_7$ | 63 | 30 | 6 |
| $c_8$ | 63 | 7 | 15 |

ADAPTIVE POWER CONTROL AND CODING SCHEME FOR MOBILE RADIO SYSTEMS

FIELD OF THE INVENTION

The present invention relates to the field of mobile radio communications systems and more particularly to the problem of reducing the power consumed by wireless transmitters while increasing the number of simultaneous connections supported.

BACKGROUND OF THE INVENTION

Mobile radio channels are often characterized by the unpredictability of the channel due to, inter alia, rayleigh fading and long term shadow fading. The channel quality may degrade as a result of several factors such as, for example, co-channel interference, adjacent channel interference, propagation path loss, and multi-path propagation (i.e., rayleigh fading). Transmission errors typically occur in bursts when fading causes the signal level to go below the noise or interference level. Therefore, explicit measures often need to be taken to maintain an acceptable level of quality of the transmission over a radio channel.

Each radio channel connection typically has a reliability constraint associated with it. This channel reliability may, for example, be defined in terms of the bit-error-rate (BER) or, alternatively, the word-error-rate (WER) as experienced at the receiver. A given connection will typically desire some particular average word-error-rate, $WER_{des}$. There are two categories of techniques which have been heretofore employed for keeping the WER from exceeding some predetermined required threshold: (a) increasing the power transmitted, and (b) improving the data encoding.

Various channel quality improvement techniques have been heretofore proposed and/or implemented in each of these categories. For example, power control (i.e., the adjustment of the transmission power level) based on the carrier-to-interference ratio (CIR) is one well-known technique for managing co-channel interference and increasing throughput in a multi-user environment. Power control may also be used for improving the quality-of-service (QOS) over a channel. Many portable radios and most base station equipment have the ability to transmit at different power levels. The other technique which is frequently used for improving the quality of the channel seen by the receiver is error control by data encoding. Various encoding schemes have been heretofore proposed and/or implemented for present analog and digital cellular systems. Unfortunately, each of these alternative approaches (i.e., power control and data encoding) has certain respective drawbacks limiting their effectiveness.

The first approach—power control—has often been employed for reducing co-channel interference and increasing the capacity of cellular radio systems. In a cellular environment, for example, the average received power at a receiver depends on the characteristics of the channel and the distance between the transmitter and the receiver. The loss in signal strength due to the distance factor is commonly referred to as the "propagation path loss." In free space, the causes of propagation path loss include the frequency of transmission, f, and the distance between the transmitter and the receiver, d, related as shown below:

$$\frac{P_r}{P_t} = \frac{1}{(4\pi df/C)^\alpha} \quad (1)$$

where, $P_t$ is the transmitted power, $P_r$ is the received power in free space, c is the speed of light, and $\alpha$ is an attenuation constant.

As the mobile receiver moves away from the transmitter, the power of the received signal decreases, the CIR also decreases, and, therefore, the WER experienced by the receiver increases. Thus, as the distance between the transmitter and receiver increases, power control schemes are used to increase the transmitted power so as to maintain the signal power seen at the receiver and to keep the WER below a given threshold value.

There are, however, several disadvantages to indiscriminately increasing the transmitted power. First, the battery power at a mobile unit is a limited resource and needs to be conserved. Second, increasing the transmitted power on one channel, irrespective of the power levels used on other channels, can increase the co-channel interference seen on other channels and thereby degrade the quality of transmission over these other channels. Finally, there is a limit to which a transmitter can increase its power, and when that limit is reached, no further improvement in WER can be achieved with use of such a power control technique.

The second approach—data encoding—also has its drawbacks. Specifically, forward error correction (FEC) and automatic repeat request (ARQ) are two well-known error control techniques commonly used for noisy channels. In a system that uses FEC for error control, for example, the transmitter encodes the data using a given code, while the receiver, which has been informed of the code used, decodes the data at the receiving end. Many such systems using conventional block or convolutional codes have been explored and/or employed.

Specifically, a code is said to be an (n,k,t) code if, for k information bits, the code adds (n-k) redundant bits so as to correct any t errors in the resulting n bits. Power transmitted per information bit for an (n,k,t) code may be defined to be the value of (n/k)P, where P is the power used in transmitting one bit. The code rate of an (n,k,t) code may be defined to be the value k/n, i.e., the ratio of the number of information bits in a codeword to the total number of bits. Given the channel conditions, the code rate must be chosen carefully to satisfy the channel reliability requirements. If the BER experienced by the channel is, for example, $P_b$, and the channel is encoded using a bit-interleaved (n,k,t) code, then the WER for a word of size n bits as seen at the receiver is as follows:

$$WER = \sum_{i=t+1}^{n} \binom{n}{i} p_b^i (1-p_b)^{n-i} \quad (2)$$

(Note that this equation assumes that the "bursty" nature of errors is countered by using a code which is significantly bit-interleaved, such that each bit error in a word is likely to be independent of others.)

As the distance between the transmitter and the receiver increases, the signal strength at the receiver decreases (assuming the power transmitted remains constant). Hence, the BER and the WER experienced at the receiver increase. In order to keep the WER within a predetermined threshold value, therefore, the encoding of the data needs to be correspondingly increased. If the encoding is increased, however, the throughput of the wireless channel goes down, i.e., more redundant bits have to be transmitted for the same number of information bits. This can also increase the delay in transmitting a given amount of information. Hence, like power control, using only error correction to improve the WER experienced by the receiver also has serious drawbacks.

SUMMARY OF THE INVENTION

In accordance with an illustrative embodiment of the present invention, a dynamic combined power control and forward error correction control (FEC) technique for mobile radio systems is used to decrease the power consumed by wireless transmitters while increasing the number of simultaneous connections which may be supported thereby. Moreover, this illustrative embodiment comprises a distributed technique, where individual transmitter-receiver pairs adaptively determine the minimal power and FEC required to satisfy specified quality-of-service (QOS) constraints.

Specifically, and in accordance with an illustrative embodiment of the present invention, a first portion of a signal is encoded with a first code to generate a first encoded signal portion. Then, the first encoded signal portion is transmitted with a first power level. Next, parameter data is received, wherein the parameter data is representative of one or more characteristics of a received signal portion having been received by the receiver, the received signal portion having been based on the transmitted first encoded signal portion. A second code and a second power level is then determined based on the received parameter data, and a second portion of the signal is encoded with the second code to generate a second encoded signal portion. Finally, the second encoded signal portion is transmitted with the second power level.

DETAILED DESCRIPTION

Figure 1:
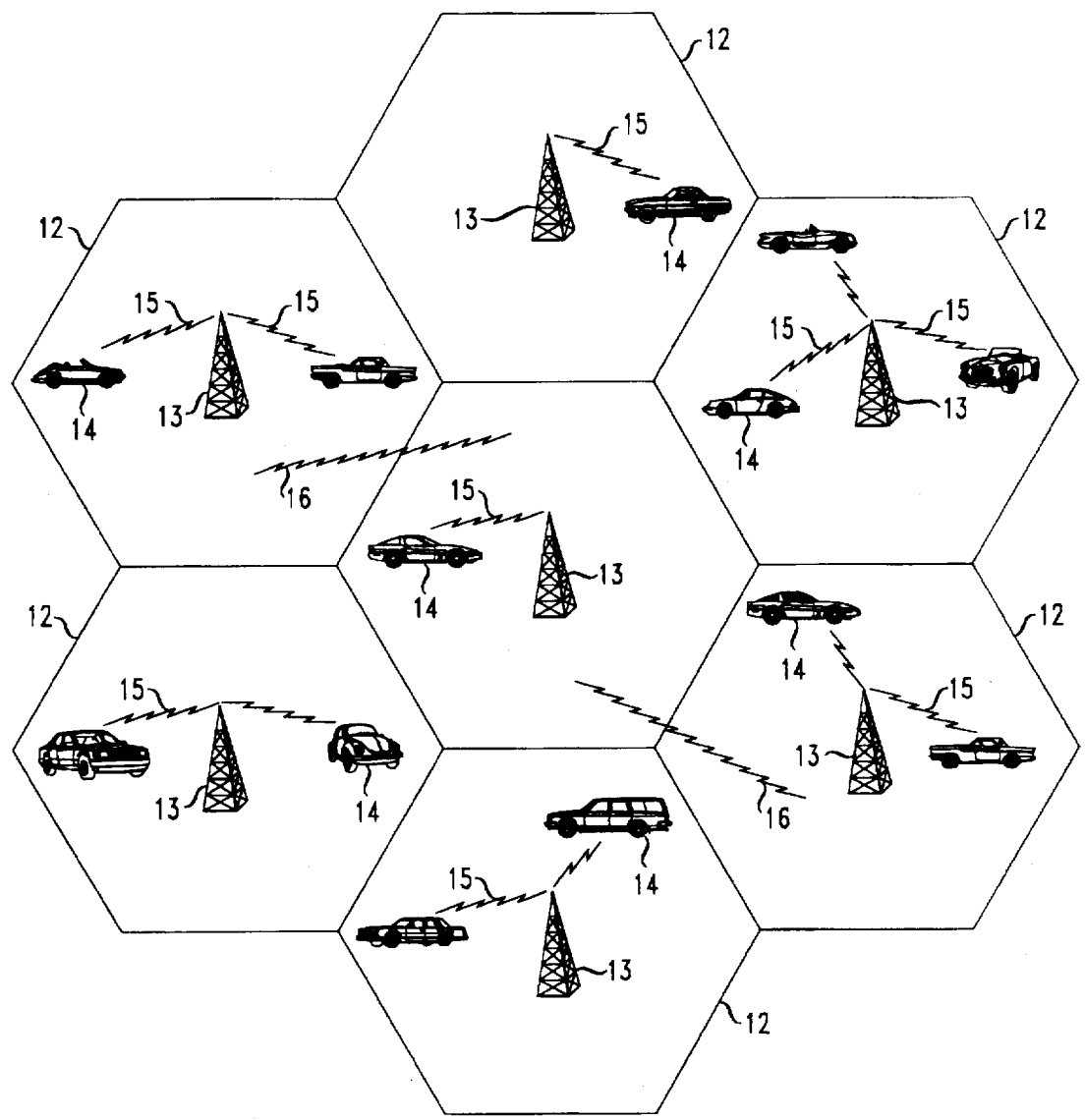
FIG. 1 shows a typical cell-based mobile wireless communications environment in which an illustrative embodiment of the present invention may be advantageously employed.

FIG. 1 shows a typical cell-based mobile wireless communications environment in which an illustrative embodiment of the present invention may be advantageously employed. The illustrative environment comprises a plurality of hexagonal cells 12, each of which contains therein a corresponding base station 13 placed approximately at the center thereof, and one or more mobile units 14 (e.g., automobiles) located within various ones of the cells. Each mobile unit 14 is in communication with the base station corresponding to the cell in which the mobile unit is located, the communication being effectuated with use of wireless communications links 15. Some or all of these communications links may advantageously comprise a two-way communications link for providing, e.g., two-way voice communications. In addition, one or more interference signals 16 may be present throughout the environment. Moreover, some or all of communications links 15 may themselves interfere with the communication being effectuated by other ones of communications links 15.

A set of frequencies can be assigned to each cell such that each communications link 15 makes use of one of the frequencies assigned to the given cell. Cells using the same set of frequencies are advantageously placed symmetrically on the hexagonal grid. A co-channel cell is defined as a cluster of seven hexagonal cells, and a given frequency or channel is advantageously assigned to only one cell in a co-channel cell.

Unlike prior art schemes that use only power control or only error-correction for managing the quality of transmission over a wireless channel, the illustrative embodiment of the present invention described herein makes judicious use of both power control and error correction for improvement of channel quality. Moreover, a feedback loop is advantageously used for changing the power as well as the encoding level, thereby resulting in a fully adaptive approach. The illustrative method also comprises a distributed approach that advantageously does not rely on a central decision making process, and, therefore, does not require simultaneous knowledge of the state of a plurality of connections.

Figures 2, 3:
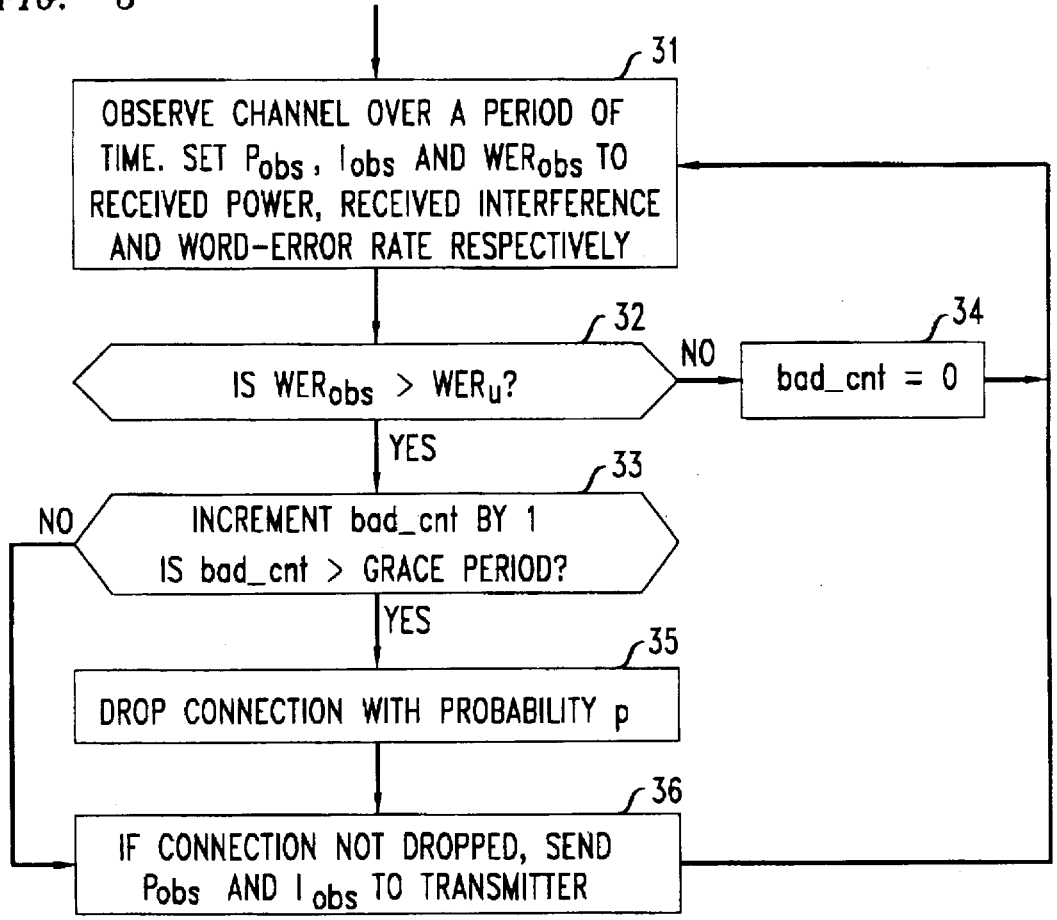
FIG. 2 shows one possible example of a table comprising a set of possible encoding schemes for use in an illustrative embodiment of the present invention.
FIG. 3 shows a flow-chart illustrating a method of operation of a mobile radio receiver operating in accordance with an illustrative embodiment of the present invention.

For purposes of explanation, the following assumptions may be made regarding the transmitter and receiver of the illustrative embodiment described herein:

1. All transmitters have minimum and maximum power levels at which they can transmit signals.
2. The set of possible encoding schemes is given by a predetermined set, $C=\{c_1, c_2, \ldots, c_n\}$, such as, for example, the illustrative set of BCH (Bose, Chaudhuri and Hocquenghem) codes as shown in the table of FIG. 2.
3. The illustrative receiver monitors the observed power, $P_{obs}$, and the word-error-rate, $WER_{obs}$. It can also observe the noise and interference level, $I_{obs}$, by monitoring the channel during periods when it is idle.

As described above, channel quality control using only power control may often be undesirable since it increases the power transmitted per information bit. Similarly, channel quality control using only FEC may not be beneficial to the system, since the channel may have very low throughput if the data is too strongly encoded. Therefore, in accordance with an illustrative embodiment of the present invention, a method which incorporates both of these techniques is advantageously employed.

Specifically, a "power-code pair" is defined to characterize the transmission characteristics provided on a given channel at a given time. A channel may be said to use a given power-code pair, $(P_r, c_r)$, if it is transmitting at a power level $P_r$ and the data being sent on the channel is being encoded using code $c_r$. In addition, a predetermined "Code-WER" table is advantageously provided to the system, wherein each entry in the table provides the value of the CIR which is required for a given value of the WER and a given encoding scheme. Specifically, an entry $(c_i, w_j)$ in the Code-WER table, corresponding to code $c_i$ and desired word-error-rate $w_j$, gives the CIR required at the receiver for the receiver to experience a word-error-rate of $w_j$ when the data is encoded using code $c_i$. (Note that all of the codes described herein are illustratively presumed to be bit-interleaved cyclic codes, familiar to those of ordinary skill in the art.) The word-error-rate for a data packet with k information bits encoded using an (n,k,t) code is given by equation (2) above.

In accordance with an illustrative embodiment of the present invention, an entry in the Code-WER table may be calculated as follows. Given the desired WER and the code, the BER ($P_b$) in equation (2) above can be advantageously precalculated. BER is a function of the CIR and the modulation scheme. Knowing the modulation scheme, the average CIR can be calculated from the BER. Assuming, for example, the use of a binary phase shift key (BPSK) modulation scheme and fast fades, the relationship between BER and CIR is given by:

$$<BER> = \frac{1}{2} \left( 1 - \frac{1}{\sqrt{1 + \frac{1}{CIR}}} \right) \quad (3)$$

From the above equations, a Code-WER table can be constructed for a given set of codes and a corresponding set of desired word-error-rates.

In accordance with an illustrative embodiment of the present invention, each transmitter-receiver pair individually determines the appropriate power-code pair to use for its subsequent transmission. Specifically, based on parameter data received from the receiver, the transmitter chooses a power-code pair, and then communicates the chosen encoding scheme to the receiver. More particularly, the method of the illustrative embodiment described herein operates as follows. During a connection, the receiver periodically monitors the received signal strength and the average WER. When a connection between a transmitter and a receiver is established, the transmitter uses the monitored signal strength and the WER on the channel between the two for setting the power and the encoding levels. The choice of the power and encoding levels is performed with the goal of minimizing the power used in transmitting a single information bit for a given quality of service. (The quality of service may be defined in terms of any of several parameters such as, for example, carrier-to-interference ratio, channel throughput, reliability, BER, etc.)

Consider, for example, a base station sending data to a mobile receiver. (The transmission of data from a mobile transmitter to a base station uses a completely analogous analysis.) If the mobile unit is moving away from the base station and the word-error-rate observed by the mobile increases beyond a predetermined upper limit, $WER_u$, the mobile unit advantageously informs the base station of the drop in the channel quality and the base station changes the power level and/or the encoding level based on this feedback. The base station then informs the mobile receiver of the change in encoding, so that the mobile unit can use the correct (i.e., corresponding) decoding scheme.

The receiver observes the noise or interference level, $I_{obs}$, by monitoring the channel when it is idle. During transmission, the receiver also monitors the received power level and the word-error-rate. The CIR observed at the receiver is a function of the power observed at the receiver and the noise/interference level seen by the receiver. Thus, the signal power, $P_s$, as seen at the receiver is $P_{obs} - I_{obs}$. Therefore, the received CIR, $CIR_s$, may be determined as follows:

$$CIR_s = \frac{P_s}{I_{obs}} = \frac{P_{obs} - I_{obs}}{I_{obs}} \quad (4)$$

If the time between the measurement of the CIR and the calculation of the new power-code pair is small, it can be reasonably assumed that the noise level remains the same. Given the desired word-error-rate at the receiver, $WER_{des}$, and given the encoding scheme, the required carrier-to-interference ratio, $CIR_s^*$, can be obtained from the code-WER table. The observed signal power, $P_s^*$, for this CIR can be calculated using the values of $P_{obs}$, $CIR_s$ and $CIR_s^*$, as follows:

$$P_s^* = \frac{P_s}{CIR_s} CIR_s^* \quad (5)$$

Power observed is a function of the power transmitted and the distance between the transmitter and the receiver. If the time between the previous measurement and the power-code pair computation is small, it can be reasonably assumed that the mobile unit has moved a distance which is nearly equal to zero. Thus, the power observed will be directly proportional to the power transmitted. The use of the following equations determines the transmitted power as a function of the received signal power:

$$P_s = C \frac{P_t}{d^\alpha} \quad (6)$$

$$P_t^* = \frac{P_s^*}{P_s} P_t,$$

where $P_t$ is the power at which transmission was performed when the observed value of signal power at the receiver was $P_s$, $P_t^*$ is the power at which transmission should be performed in order to see a signal power of $P_s^*$ at the receiver.

The distributed approach in accordance with the illustrative embodiment of the present invention advantageously does not rely on a centralized process to determine the correct power-code pair for all transmitters. As such, changes by one transmitter can effect the transmissions of another transmitter. In general, therefore, it may not be possible for all connections to be maintained at the specified QOS. Thus, in some situations, connections will need to be dropped. One illustrative technique for dropping connections is advantageously distributed in that it does not require the sharing of information between various transmitters and receivers. Note that since the procedure for computing new power-code pairs is iterative (necessarily incurring a finite delay with each iteration), satisfactory QOS conditions may not be met for several time frames. Therefore, connections may be advantageously maintained (i.e., not dropped) despite the occurrence of a single time frame of unsatisfactory QOS. On the other hand, a bad connection should not persist too long if removing it will allow other connections to satisfy their QOS conditions.

Specifically, according to an illustrative embodiment of the present invention, an unsatisfactory connection is given a "grace period" of t time steps. After this grace period is over, the procedure assigns to the connection a small initial probability that the connection will be dropped. This probability is increased on each consecutive unsuccessful attempt to find a satisfactory power-code pair. If a satisfactory power-code pair is indeed found, then the grace period is reinstated for use upon the next unsuccessful power-code pair change. Thus, the probability of dropping the connection, $P_{drop}$, is as follows:

$$P_{drop} = [1 - (1 - P_{initial})^x] \quad \text{for } x > t \quad (7)$$
$$= 0 \quad \text{otherwise,}$$

where $P_{initial}$ is the probability of dropping the connection after one unsatisfactory attempt to find a power-code pair, and x is the number of consecutive unsuccessful attempts. The value chosen for $P_{initial}$ may, for example, be approximately $10^{-2}$.

Figure 4:
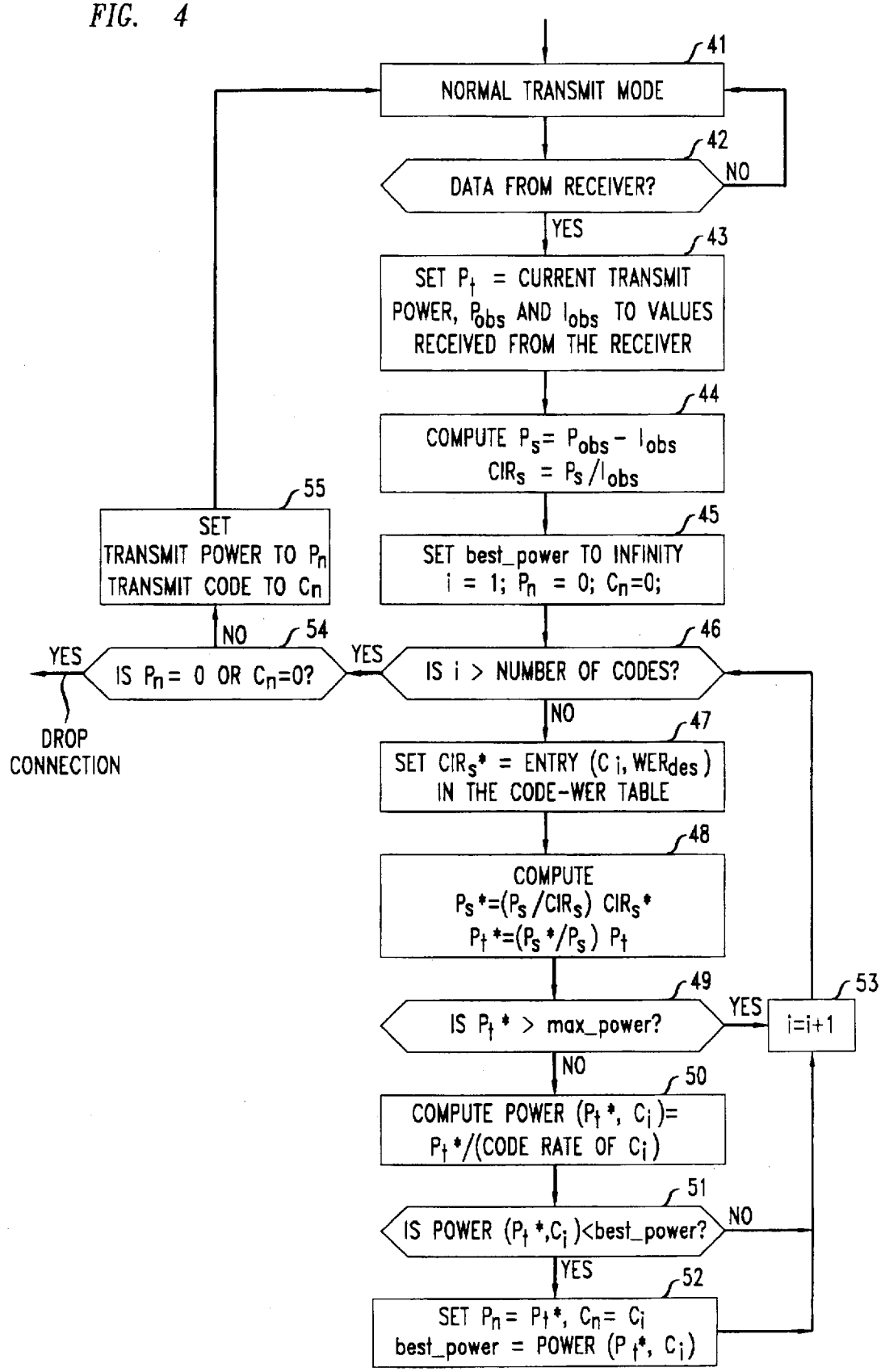
FIG. 4 shows a flow-chart illustrating a method of operation of a mobile radio transmitter operating in accordance with an illustrative embodiment of the present invention.

FIGS. 3 and 4 show flow-charts illustrating a method of operation of a mobile radio receiver and a mobile radio transmitter, respectively, each operating in accordance with an illustrative embodiment of the present invention. Specifically, the illustrative procedure shown in FIG. 3 may be used by a mobile radio receiver to monitor the channel quality of its connection. In particular, step 31 observes the channel over a given period of time, and sets the observed power parameter ($P_{obs}$) to the received power, the observed interference parameter ($I_{obs}$) to the received interference, and the observed error rate parameter ($WER_{obs}$) to the word-error rate. Step 32 compares the word-error rate to an upper tolerance limit therefor ($WER_u$), and, if the limit is exceeded, step 33 increments the count of unsatisfactory time frames (bad_cnt) and compares this count with the predetermined grace period. If the count of unsatisfactory time frames exceeds the grace period, step 35 drops the connection with a probability p. If the connection is not dropped, or if the grace period is not exceeded, step 36 sends the observed power parameter and the observed interference parameter to the transmitter.

The illustrative procedure shown in FIG. 4 is used by a mobile radio transmitter in order to compute a new power-code pair when the above-described parameter data is received from the receiver (thereby indicating that the connection is unsatisfactory). The new power-code pair computed by this procedure is based on the received parameter data. Specifically, step 41 performs normal transmit mode (i.e., continuing to transmit with the same power-code pair) until step 42 determines that parameter data has been received from the receiver. Then, step 43 sets parameter $P_t$ to the current transmit power and parameters $P_{obs}$ and $I_{obs}$ to the corresponding values received from the receiver. Step 44 computes the received signal power ($P_s$) and the received carrier-to-interference ratio ($CIR_s$) based on the parameter data received.

Then, steps 45 through 52 execute an iterative process (i.e., a loop) for determining a new power-code pair to be used for the given connection. In particular, each code in the predetermined set of encoding schemes ($c_1$ through $c_n$) is examined, in turn, to determine the code which may be used with the least overall consumption of power (i.e., the power consumed per information bit) which nonetheless satisfies the desired criteria (i.e., the desired word-error rate and desired carrier-to-interference ratio). The Code-WER table (step 47) and equations (5) and (6) as described above (step 48) are advantageously used to determine the required power for a given code, and the overall power consumption is then determined (step 50) and compared to the various alternative code choices (step 51). (Step 49 ensures that the given code does not require a power level which exceeds the maximum transmission capacity of the transmitter.) If, in fact, no acceptable power-code pair can be found, step 54 causes the connection to be dropped. Otherwise, step 55 sets the (new) transmit power and the (new) transmit code accordingly, and returns to step 41 to perform the signal transmission in accordance therewith.

Although a specific embodiment of this invention has been shown and described herein, it is to be understood that this embodiment is merely illustrative of the many possible specific arrangements which can be devised in application of the principles of the invention. For example, the illustrative embodiment described herein focused on systems using forward-error correction only, although the present inventive method can also be used for systems using a combination of FEC and ARQ. Also by way of example, even though the illustrative embodiment herein described a distributed technique wherein each individual transmitter-receiver pair determined the appropriate power-code pair to be used for subsequent transmissions, the present inventive method could be used with a centralized technique in which a common (i.e., centralized) decision-making process is used to determine transmission parameters for the various transmitters. The extension to any such systems will be obvious to those skilled in the art. Numerous and varied other arrangements can be devised in accordance with these principles by those of ordinary skill in the art without departing from the spirit and scope of the invention.

We claim:

1. A method of transmitting a signal to a receiver across a wireless communications channel, the method comprising the steps of:

encoding a first portion of the signal with a first code to generate a first encoded signal portion;

transmitting the first encoded signal portion with a first power level;

receiving parameter data representative of one or more characteristics of a received signal portion having been received by the receiver, the received signal portion having been based on the transmitted first encoded signal portion;

determining a second code and a second power level based on the received parameter data;

encoding a second portion of the signal with the second code to generate a second encoded signal portion; and transmitting the second encoded signal portion with the second power level.

2. The method of claim 1 wherein the one or more characteristics of the received signal portion comprises an observed signal power level.

3. The method of claim 1 wherein the one or more characteristics of the received signal portion comprises an observed interference signal level.

4. The method of claim 1 wherein the one or more characteristics of the received signal portion comprises an observed error rate.

5. The method of claim 4 wherein the parameter data is received from the receiver in response to the receiver having determined that the observed error rate exceeds a predetermined quality of service threshold.

6. The method of claim 1 wherein the first code and the second code each comprises a bit-interleaved cyclic code.

7. The method of claim 1 wherein the step of determining the second code and the second power level is further based on the first power level.

8. The method of claim 1 wherein the step of determining the second code and the second power level comprises the step of selecting a power-code pair comprising a power level and an associated code to be used therewith.

9. The method of claim 8 wherein the step of selecting a power-code pair is based on the total power consumed when a signal encoded with the associated code comprised in the selected power-code pair is transmitted with the power level comprised in the selected power-code pair.

10. The method of claim 1 further comprising the step of determining whether the step of transmitting the second encoded signal portion with the second power level will result in a predetermined quality of service threshold being met at the receiver.

11. The method of claim 10 further comprising the step of dropping the connection to the receiver if it is determined that the step of transmitting the second encoded signal portion with the second power level will not result in the predetermined quality of service threshold being met at the receiver.

12. A mobile radio transmitter apparatus for transmitting a signal to a receiver across a wireless communications channel, the mobile radio transmitter comprising:

means for encoding a first portion of the signal with a first code to generate a first encoded signal portion;

means for transmitting the first encoded signal portion with a first power level;

means for receiving parameter data representative of one or more characteristics of a received signal portion having been received by the receiver, the received signal portion having been based on the transmitted first encoded signal portion;

means for determining a second code and a second power level based on the received parameter data;

means for encoding a second portion of the signal with the second code to generate a second encoded signal portion; and means for transmitting the second encoded signal portion with the second power level.

13. The apparatus of claim 12 wherein the one or more characteristics of the received signal portion comprises an observed signal power level.

14. The apparatus of claim 12 wherein the one or more characteristics of the received signal portion comprises an observed interference signal level.

15. The apparatus of claim 12 wherein the one or more characteristics of the received signal portion comprises an observed error rate.

16. The apparatus of claim 15 wherein the parameter data is received from the receiver in response to the receiver having determined that the observed error rate exceeds a predetermined quality of service threshold.

17. The apparatus of claim 12 wherein the first code and the second code each comprises a bit-interleaved cyclic code.

18. The apparatus of claim 12 wherein the means for determining the second code and the second power level determines the second code and the second power level further based on the first power level.

19. The apparatus of claim 12 wherein the means for determining the second code and the second power level comprises means for selecting a power-code pair comprising a power level and an associated code to be used therewith.

20. The apparatus of claim 19 wherein the means for selecting a power-code pair selects a power-code pair based on the total power consumed when a signal encoded with the associated code comprised in the selected power-code pair is transmitted with the power level comprised in the selected power-code pair.

21. The apparatus of claim 12 further comprising means for determining whether the transmission of the second encoded signal portion with the second power level will result in a predetermined quality of service threshold being met at the receiver.

22. The apparatus of claim 21 further comprising the means for dropping the connection to the receiver if it is determined that the transmission of the second encoded signal portion with the second power level will not result in the predetermined quality of service threshold being met at the receiver.

* * * * *